US006846436B1

United States Patent
Kitamura et al.

(10) Patent No.: US 6,846,436 B1
(45) Date of Patent: Jan. 25, 2005

(54) SEMICONDUCTIVE POLYVINYLIDENE FLUORIDE RESIN COMPOSITION

(75) Inventors: Hideki Kitamura, Fukushima (JP);
Satoru Matsunaga, Fukushima (JP);
Mitsuru Ito, Fukushima (JP);
Nobuhiro Moriyama, Fukushima (JP)

(73) Assignee: Kureha Kagaku Kogyo K.K., Tokyo (JP)

( * ) Notice: Subject to any disclaimer, the term of this patent is extended or adjusted under 35 U.S.C. 154(b) by 0 days.

(21) Appl. No.: 10/019,858

(22) PCT Filed: May 11, 2000

(86) PCT No.: PCT/JP00/03020

§ 371 (c)(1),
(2), (4) Date: Nov. 9, 2001

(87) PCT Pub. No.: WO00/69968

PCT Pub. Date: Nov. 23, 2000

(30) Foreign Application Priority Data

May 12, 1999 (JP) .............................. 11/131865

(51) Int. Cl.$^7$ ................................. H01B 1/24
(52) U.S. Cl. ...................... 252/511; 524/157
(58) Field of Search .................. 252/511; 524/156, 524/157

(56) References Cited

U.S. PATENT DOCUMENTS 3,703,569 A 11/1972 Wolkowicz
3,829,408 A 8/1974 Wolkowicz
4,013,531 A 3/1977 Nakamura et al.
6,610,766 B1 * 8/2003 Kitamura et al. ............ 524/156

FOREIGN PATENT DOCUMENTS

| EP | 0333062 | 9/1989 |
| EP | 0942038 | 9/1999 |
| JP | 47-3835 | 2/1972 |
| JP | 51-32330 | 3/1976 |
| JP | 51-110658 | 9/1976 |
| JP | 51-111337 | 10/1976 |
| JP | 54-127872 | 10/1979 |
| JP | 55-26973 | 7/1980 |
| JP | 60-177064 | 9/1985 |
| JP | 61-72061 | 4/1986 |
| JP | 6-329861 | 11/1994 |
| JP | 7-003100 | 1/1995 |
| JP | 8-059940 | 3/1996 |
| JP | 8-272208 | 10/1996 |
| JP | 11-029678 | 2/1999 |
| JP | 11-323052 | 11/1999 |

* cited by examiner

Primary Examiner—Mark Kopec
(74) Attorney, Agent, or Firm—Dinsmore & Shohl LLP (57) ABSTRACT

A semiconductive polyvinylidene fluoride resin composition comprising 100 parts by weight of a polyvinylidene fluoride resin, 0.03 to 10 parts by weight of at least one tetraalkylammonium salt selected from the group consisting of tetraalkylammonium sulfates and tetraalkylammonium sulfites, and 1 to 20 parts by weight of conductive carbon black. A formed or molded product composed of the semiconductive polyvinylidene fluoride resin composition.

12 Claims, 2 Drawing Sheets

SEMICONDUCTIVE POLYVINYLIDENE FLUORIDE RESIN COMPOSITION

TECHNICAL FIELD

The present invention relates to a semiconductive polyvinylidene fluoride resin composition, and more particularly to a semiconductive polyvinylidene fluoride resin composition which can uniformly and precisely exhibit a fixed volume resistivity within a range of $10^4$ to $10^{12}$ Ωcm, scarcely undergoes changes in volume resistivity and surface resistivity even when an environmental moisture varies.

The semiconductive polyvinylidene fluoride resin composition according to the present invention is suitable for use as a material for forming at least surface layers of static charge controlling members (semiconductive members) such as charging rolls, developing rolls, transfer rolls, conveyer rolls, charging belts, developing belts, transfer belts, conveyer belts and static charge eliminating belts in, for example, image forming apparatus of an electrophotographic system making good use of its semiconductivity.

The semiconductive polyvinylidene fluoride resin composition according to the present invention is also suitable for use in application fields making good use of its static electricity controlling property, antistatic property, anti-dust-collecting property and the like, for example, as static charge controlling members such as packaging materials (films, bags, containers, etc.) for electronic parts, wall paper, sheathing materials for OA apparatus and antistatic partitions.

In the present invention, the term, "semiconductive polyvinylidene fluoride resin composition" means that the resin composition has a volume resistivity situated between an insulator and a metallic conductor, and more specifically means a resin composition having a volume resistivity within a range of $10^4$ to $10^{12}$ Ωcm.

BACKGROUND ART

In the fields of electric and electronic apparatus, resin materials the volume resistivities of which have been precisely controlled within a semiconductive range of $10^4$ to $10^{12}$ Ωcm are demanded. For example, in image forming apparatus (electrophotographic copying machines, electrostatic recording apparatus, etc.) such as copying machines, facsimiles and laser-beam printers of the electrophotographic system, images are formed through steps of charging, exposure, development, transfer, fixing and static charge elimination. In each of these steps, respective members formed of a resin material the volume resistivity of which falls within the semiconductive range are used. In such a semiconductive resin material, the volume resistivity is required to be precisely controlled within a fixed range.

A charging roll or belt, a transfer roll or belt, a conveyer roll or belt, a developing roll, a blade for controlling the thickness of a toner layer, and the like installed in such an image forming apparatus are required to be semiconductive at least at their surface layers, and specifically to have a fixed volume resistivity within a range of $10^4$–$10^{12}$ Ωcm.

For example, in a charging system making use of the charging roll or belt, voltage is applied to the charging roll, and the charging roll is then brought into contact with a photosensitive drum to directly apply an electric charge to the photosensitive drum so as to equally and uniformly charge the photosensitive drum. In a development system making use of the developing roll, a toner is adsorbed in a charged state on the surface of the developing roll by frictional force between the developing roll and a toner supply roll, and this toner is uniformly leveled by the blade for controlling the layer thickness of the toner, and the toner is then caused to fly toward an electrostatic latent image formed on the photosensitive drum by electric attraction force to develop the latent image. In a transferring system making use of the transfer roll or belt, voltage having a polarity opposite to that of the toner is applied to the transfer roll or belt to generate an electric field, whereby the toner on the photosensitive drum is transferred to a transfer material by electric attraction force generated by the electric field.

Accordingly, the static charge controlling members such as the charging roll or belt in the image forming apparatus are required to have a low volume resistivity within a proper range. The volume resistivity itself is required to be uniform in distribution. If the volume resistivity varies with location, no high-quality image can be provided. For example, if the volume resistivity distribution of the charging roll or belt is uneven, it is difficult to equally and uniformly charge the photosensitive drum, so that the quality of the resulting image is deteriorated. In these members, it is also required that their volume resistivities and surface resistivities do not very vary with the change of environmental moisture. If the volume resistivities and surface resistivities of the static charge controlling members greatly vary with the change of humidity in an ordinary use environment, no high-quality image can be stably provided.

Further, when dust, toner and/or the like are adsorbed on sheathing materials and parts of OA apparatus formed from a resin material, their appearances are impaired, or the cause of trouble is formed. When resin-made apparatus and parts used in the fabrication processes of semiconductor devices, LCD and the like, and films, bags and containers for packaging or conveying electronic parts such as IC and LSI adsorb dust by generation of static electricity, the quality of the electronic parts is impaired. It is therefore required that a volume resistivity of about $10^4$–$10^{12}$ Ωcm is imparted to resin materials used in these application fields, particularly, in face-layer materials thereof in order for the resin materials to have static charge controlling property.

On the other hand, polyvinylidene fluoride resins are excellent in heat resistance, chemical resistance, stain resistance, anti-adhesion property, molding and processing ability and the like, and thus suitable for use as resin materials for such various static charge controlling members as described above. The polyvinylidene fluoride resins themselves are insulators. As methods for lowering the electrical resistance of the polyvinylidene fluoride resins and molded or formed products (hereinafter may be referred to as "moldings") thereof, therefore, there have heretofore been proposed (1) a method in which an organic antistatic agent is applied to the surfaces of the resin moldings, (2) a method in which an organic antistatic agent is incorporated into the resins, (3) a method in which a conductive filler such as carbon black or metallic powder is incorporated into the resins, and (4) a method in which an ionic electrolyte is incorporated into the resins.

However, the method (1) involves a problem that since the polyvinylidene fluoride resins have excellent anti-adhesion property, the antistatic agent easily falls off from the surfaces of the moldings by wiping or washing the surfaces. In the method (2), a surfactant or hydrophilic resin is used as the organic antistatic agent. Since the method making use of the surfactant adopts a mechanism that the surfactant is caused to bleed out of the surface of each molding, thereby imparting antistatic property thereto, the volume resistivity and antistatic property of the molding greatly vary with the changes of environments such as temperature and humidity. In addition, high stain resistance, which is a merit of the polyvinylidene fluoride resins, is impaired. In the method making use of the hydrophilic resin, it is necessary to incorporate a great amount of the hydrophilic resin in order to achieve a desired antistatic effect. Therefore, excellent physical properties inherent in the polyvinylidene fluoride resins, such as stain resistance, ozone resistance and solvent resistance, are lowered. In addition, the method involves a problem that the dependency of volume resistivity and antistatic property on humidity becomes high. The stain resistance and solvent resistance are properties required in the case where a toner applied to a member arranged in an image forming apparatus of the electrophotographic system is removed by cleaning. Since an image forming apparatus equipped with a corona discharge device or the like generates ozone, the ozone resistance is also a property required of members in such an apparatus.

The method (3) is adopted in many fields. For example, a roll member such as a charging roll, developing roll or transfer roll is formed by coating a core bar with a semiconductive resin composition obtained by incorporating a conductive filler into a resin. However, the semiconductive resin composition with the conductive filler dispersed in the resin generally has an extremely uneven distribution in volume resistivity. In many cases, a scatter of the distribution amounts to several figures. Therefore, such a semiconductive resin composition has involved a problem from the viewpoint of practical performance. In addition, the charged amount of the conductive filler must be increased in order to attain the required level of semiconductivity. For that reason, there is encountered a problem that the molding and processing ability and mechanical strength of the resulting polyvinylidene fluoride resin composition are lowered, or its hardness becomes too high.

The method (4) of incorporating the ionic electrolyte is expected to be a method effective for imparting semiconductivity to a polyvinylidene fluoride resin, judging from the fact that polyvinylidene fluoride (PVDF) has been known from of old to be a good conductor to ions (for example, Japanese Patent Application Laid-Open Nos. 32330/1976, 110658/1976, 111337/1976 and 127872/1979). However, a resin composition obtained by incorporating an inorganic metal salt such as lithium chloride or potassium chloride, which is a typical electrolyte, into a polyvinylidene fluoride resin has been difficult to lower its volume resistivity to $1 \times 10^{12}$ Ωcm or lower, since these inorganic metal salts are only slightly soluble in PVDF. There has also been a problem that aggregate of the inorganic metal salt added in excess forms the cause of fish eye.

When kneading is conducted at a higher temperature or for a longer period of time in order to fully dissolve the inorganic metal salt in the polyvinylidene fluoride resin to prevent formation of the aggregate, the resin and/or the electrolyte is decomposed to impair the mechanical properties and appearance of the resulting moldings. In the case of a deliquescent inorganic metal salt such as a lithium salt, the resulting resin composition becomes hygroscopic when such a metal salt is filled in a great amount. Therefore, this case involves problems that the volume resistivity of the resin composition greatly varies with the change of humidity, and that the surface of the resulting molding becomes sticky due to the deliquescence of the metal salt bled out.

As a method for improving the solubility of an electrolytes in a resin, Japanese Patent Application Laid-Open Nos. 177064/1985 and 72061/1986 have proposed a method in which a polar solvent such as propylene carbonate is contained in the resin. However, this method has involved problems that the Young's modulus of the resin is markedly lowered, and that the surface of the resulting molding becomes sticky due to the electrolyte and solvent bled out.

There have hitherto been proposed methods of using a quaternary ammonium salt as an antistatic agent for resins. For example, Japanese Patent Application Laid-Open No. 64989/1971 discloses an antistatic coating material with a quaternary ammonium salt and a resin dissolved in an organic solvent. However, this coating material is easy to fall off by washing and is hence difficult to retain its antistatic effect for a long period of time.

Japanese Patent Application Laid-Open No. 3835/1972 discloses an antistatic sheet with a quaternary ammonium salt incorporated into a polyolefin. However, this antistatic sheet depends on a mechanism that its antistatic effect is exhibited by bleed-out of the quaternary ammonium salt out of the resin, so that its conductivity and antistatic effect greatly vary with the changes of environments such as temperature and humidity. In addition, since the quaternary ammonium salt is hard to be ionized in a resin having a low polarity, such as the polyolefin, the volume resistivity of the resin cannot be lowered, though its surface resistivity can be lowered.

Further, since most quaternary ammonium salts, particularly, quaternary ammonium halides are poor in heat stability, disadvantages such as foaming and coloring arise in the resulting moldings when such a quaternary ammonium salt is kneaded with a polyvinylidene fluoride resin, the processing temperature of which is as high as 220 to 270° C., to melt-mold the resultant mixture. Even in the case of an ionic electrolyte relatively good in heat resistance, it is necessary to add a great amount of the ionic electrolyte in order to lower the volume resistivity of the polyvinylidene fluoride resin to the desired semiconductive range. However, the use of the polyvinylidene fluoride resin containing a great amount of the ionic electrolyte has involved such problems that mechanical strength of the resulting molding, such as Young's modulus is lowered, that the ionic electrolyte bleeds out to the surface of the resulting molding, that molding and processing are difficult and that cost is increased.

Accordingly, it has been difficult to control the volume resistivity of the polyvinylidene fluoride resin, particularly, to a volume resistivity of $1 \times 10^{10}$ Ωcm or lower by only adding the ionic electrolyte. In addition, such an ionic electrolyte as described above has been difficult to stably, uniformly and precisely develop the volume resistivity within a range of $10^4$ to $10^{12}$ Ωcm, preferably $10^5$ to $10^{10}$ Ωcm and also been hard to make the variation of the volume resistivity by the change of environmental moisture small even when it is used in combination with a conductive filler such as carbon black.

Since many inorganic metal salts and quaternary ammonium salts are easy to bleed out under a high-humidity environment, they have involved problems that metallic impurities on the surface of a static electricity-controlling packaging material used in packaging or conveyance in, for example, a fabrication process of semiconductor devices form the cause of the provision of rejected products, and that in a transfer roll or belt installed in an image forming apparatus of the electrophotographic system, its surface layer undergoes a change in volume resistivity due to the reduction of the ionic electrolyte in the resin, resulting in deterioration of image quality.

DISCLOSURE OF THE INVENTION

It is an object of the present invention to provide a polyvinylidene fluoride resin composition which can stably and uniformly exhibit a fixed volume resistivity within a range of $10^4$–$10^{12}$ Ωcm with good precision, and undergoes little changes in volume resistivity and surface resistivity by the change of environmental moisture.

Another object of the present invention is to provide semiconductive resin moldings such as sheets, tubes, seamless belts, fibers, containers, rolls and injection-molded products using a semiconductive polyvinylidene fluoride resin composition.

The present inventors have carried out an extensive investigation with a view toward overcoming the above-described problems involved in the prior art. As a result, it has been found that the above objects can be achieved by adding at least one quaternary ammonium salt selected from the group consisting of tetraalkylammonium sulfates and tetraalkylammonium sulfites and conductive carbon black to a polyvinylidene fluoride resin in specific blending proportions.

The resin composition according to the present invention has a volume resistivity within a semiconductive range, is free of a scatter of volume resistivity with location and can stably exhibit the desired volume resistivity with good precision. The resin composition according to the present invention also neither forms any aggregate or fish eye nor undergoes the bleed-out of any additives. Further, the resin composition according to the present invention has good processability and can hence be formed into various formed or molded products by conventional melt processing techniques. The moldings according to the present invention retain the various properties inherent in the polyvinylidene fluoride resin, such as heat resistance, chemical resistance, anti-adhesion property and stain resistance, at a high level. The present invention has been led to completion on the basis of these findings.

According to the present invention, there is thus provided a semiconductive polyvinylidene fluoride resin composition comprising 100 parts by weight of a polyvinylidene fluoride resin (A), 0.03 to 10 parts by weight of at least one tetraalkylammonium salt (B) selected from the group consisting of tetraalkylammonium sulfates (B1) represented by the formula (1):

(1)

wherein $R^1$ to $R^4$ are alkyl groups which are the same or different from one another, and $R^5$ is an alkyl or fluoroalkyl group or a hydrogen atom, and tetraalkyl-ammonium sulfites (B2) represented by the formula (2):

(2)

wherein $R^6$ to $R^9$ are alkyl groups which are the same or different from one another, and $R^{10}$ is an alkyl or fluoroalkyl group or a hydrogen atom, and 1 to 20 parts by weight of conductive carbon black (C).

According to the present invention, there are also provided moldings formed from the semiconductive polyvinylidene fluoride resin composition described above.

BEST MODE FOR CARRYING OUT THE INVENTION (A) Polyvinylidene fluoride resin:

As examples of the polyvinylidene fluoride resin (A) useful in the practice of the present invention, may be mentioned a homopolymer of vinylidene fluoride (i.e., polyvinylidene fluoride; PVDF) and copolymers of vinylidene fluoride and any other monomer copolymerizable therewith, comprising vinylidene fluoride as a principal structural unit.

Preferable examples of the vinylidene fluoride copolymers include vinylidene fluoride-hexafluoropropylene copolymers, vinylidene fluoride-tetrafluoroethylene copolymers and vinylidene fluoride-tetrafluoroethylene-hexafluoropropylene terpolymers. These polyvinylidene fluoride resins may be used either singly or in any combination thereof.

Among the polyvinylidene fluoride resins, PVDF, which is a homopolymer of vinylidene fluoride, is preferred from the viewpoints of stain resistance, ozone resistance and solvent resistance. From the viewpoints of flexibility and tear strength, it is preferred to use a vinylidene fluoride copolymer comprising vinylidene fluoride as a principal structural unit by itself or its blend with PVDF. In order to improve the adhesion property of the resulting resin composition, a vinylidene fluoride copolymer, into which a functional group has been introduced, is preferably used.

Into the polyvinylidene fluoride resin composition according to the present invention, may be blended other thermoplastic resins such as an acrylic resin and other fluorocarbon resins than the polyvinylidene fluoride resin so far as no detrimental influence is thereby imposed on the objects of the present invention.

(B) Quaternary ammonium salt:

The tetraalkylammonium sulfates (B1) useful in the practice of the present invention are quaternary ammonium salts represented by the formula (1):

(1)

wherein $R^1$ to $R^4$ are alkyl groups which are the same or different from one another, and $R^5$ is an alkyl or fluoroalkyl group or a hydrogen atom.

The tetraalkylammonium sulfites (B2) useful in the practice of the present invention are quaternary ammonium salts represented by the formula (2):

$$\left( R^7 - \underset{\underset{R^8}{|}}{\overset{\overset{R^6}{|}}{N}} - R^9 \right) R^{10}SO_3 \quad (2)$$

wherein $R^6$ to $R^9$ are alkyl groups which are the same or different from one another, and $R^{10}$ is an alkyl or fluoroalkyl group or a hydrogen atom.

Among these quaternary ammonium salts, the tetraalkylammonium sulfates (B1) are preferred because they are excellent in stability.

In these quaternary ammonium salts (B), the total number of carbon atoms of each of the alkyl groups in $R^1$ to $R^4$ and $R^6$ to $R^9$ is at least 4, preferably 8 to 30, more preferably 12 to 24, particularly preferably 15 to 20. As examples of the alkyl groups, may be mentioned short-chain alkyl groups such as methyl, ethyl, propyl, isopropyl, butyl, pentyl and hexyl groups.

When $R^5$ and $R^{10}$ are alkyl groups, short-chain alkyl groups such as methyl and ethyl groups are representative thereof. When $R^5$ and $R^{10}$ are fluoroalkyl groups, short-chain fluoroalkyl groups such as $CF_3$ and $C_2F_5$ are representative thereof.

As examples of the quaternary ammonium salts (B), may be mentioned salts composed of a quaternary ammonium cation such as $(C_2H_5)_4N^+$, $(C_3H_7)_4N^+$, $(C_4H_9)_4N^+$ or $(C_5H_{11})_4N^+$ and an anion containing a sulfate or sulfite, such as $CF_3SO_4^-$, $CH_3SO_4^-$, $HSO_4^-$, $CF_3SO_3^-$, $CH_3SO_3^-$ or $HSO_3^-$.

These quaternary ammonium salts (B) may be salts formed by combining two or more anions and cations. Four alkyl groups that the quaternary ammonium cation has may be the same or different from one another. Of these, tetraalkylammonium hydrogensulfates are preferred, with tetrabutylammonium hydrogensulfate $[(C_4H_9)_4N(HSO_4)]$ being particularly preferred. These quaternary ammonium salts may be used either singly or in any combination thereof.

(C) Conductive carbon black:

As examples of conductive carbon black useful in the practice of the present invention, may be mentioned conductive oil furnace black, acetylene black, thermal black and channel black. These conductive carbon blacks may be used either singly or in any combination thereof.

The conductive carbon black (C) used in the present invention preferably has the following natures:

(1) a DBP oil absorption of generally at least 100 ml/100 g, preferably 100 to 400 ml/100 g;

(2) an average particle diameter of generally 1 to 100 nm, preferably 10 to 50 nm; and (3) an ash content of generally at most 0.2%, preferably at most 0.1%.

The DBP oil absorption means an amount (ml) of dibutyl phthalate (DBP) absorbed in 100 g of the conductive carbon black and is a value measured by a Dibutyl Phthalate Absorpotometer. The average particle diameter means a particle size ($d_{50}$).

The conductive carbon black is preferably conductive carbon black good in dispersibility in resins so as not to impair the appearance of the resulting molding. From such a point of view, acetylene black is particularly preferred as the conductive carbon black used in the present invention.

Any commercially available product may be used as the conductive carbon black. As examples of commercially available conductive oil furnace black, may be mentioned Vulcan XC-72 and Vulcan P manufactured by Cabot Co.; and Ketjen Black EC manufactured by Lion Corporation. As examples of commercially available acetylene black, may be mentioned Denka Black manufactured by Denki Kagaku Kogyo Kabushiki Kaisha.

Semiconductive polyvinylidene fluoride resin composition:

The semiconductive polyvinylidene fluoride resin compositions according to the present invention are resin compositions comprising the polyvinylidene fluoride resin (A), the quaternary ammonium salt (B) and the conductive carbon black (C) as essential components.

A proportion of the quaternary ammonium salt (B) blended is within a range of from 0.03 to 10 parts by weight, preferably from 0.05 to 8 parts by weight, more preferably from 0.1 to 5 parts by weight, particularly preferably 0.3 to 3 parts by weight per 100 parts by weight of the polyvinylidene fluoride resin (A). If the proportion of the quaternary ammonium salt (B) blended is too low, the volume resistivity-lowering effect brought about by the addition thereof becomes little. If the proportion is too high, there is a possibility that coloring of the resin, and foaming by decomposition upon processing may occur in some cases.

A proportion of the conductive carbon black (C) blended is within a range of from 1 to 20 parts by weight, preferably from 2 to 15 parts by weight, more preferably from 3 to 10 parts by weight per 100 parts by weight of the polyvinylidene fluoride resin (A). From the viewpoints of mechanical strength and dielectric strength, the proportion of the conductive carbon black (C) blended is particularly preferably 3 to 6 parts by weight. If the proportion of the conductive carbon black (C) blended is too low, the volume resistivity-lowering effect brought about by the addition thereof becomes little. If the proportion is too high, there is encountered a problem that the volume resistivity of the resulting polyvinylidene fluoride resin composition becomes too low, the molding and processing ability and mechanical strength of the resin composition are deteriorated, or the hardness of the resulting molding becomes too high.

Proportions of the quaternary ammonium salt (B) and the conductive carbon black (C) blended may be suitably determined within the above respective ranges according to the kinds of the respective compounds used and physical properties required.

The combined use of the quaternary ammonium salt (B) and the conductive carbon black (C) can bring about the following marked action and effects:

(1) the volume resistivity of the resin composition can be controlled within a range of generally $10^4$ to $10^{12}$ $\Omega$cm, preferably $10^5$ to $10^{10}$ $\Omega$cm;

(2) a scatter of volume resistivity with location is less compared with the case where the conductive carbon black is used by itself, and the desired volume resistivity can be stably developed with good precision;

(3) since good semiconductivity is exhibited even when the proportion of the quaternary ammonium salt blended is low, the formation of aggregate and fish eye caused by ionic electrolytes is prevented, and no bleed-out occurs; and (4) since proportions of these additives blended may be controlled low, the various properties inherent in the polyvinylidene fluoride resin, such as heat resistance, chemical resistance, anti-adhesion property and stain resistance, can be retained at a high level, and the molding and processing ability of the resulting resin composition is also good.

Other additives:

In the semiconductive polyvinylidene fluoride resin compositions according to the present invention, may be contained other additives if desired. Examples of the other additives include particulate or powdery fillers such as talc, mica, silica, alumina, kaolin, ferrite, potassium titanate, titanium oxide, zinc oxide, iron oxide, magnesium hydroxide, calcium carbonate, nickel carbonate, calcium sulfate, barium sulfate, aluminum hydroxide, glass powder, quartz sand, graphite, inorganic pigments, organic metal salts and other metal oxides; and fibrous fillers such as carbon fiber, glass fiber, asbestos fiber, silica fiber, alumina fiber, zirconia fiber, boron nitride fiber, silicon nitride fiber, boron fiber and potassium titanate fiber.

These fillers may be suitably incorporated as necessary for the end application intended so far as no detrimental influence is thereby imposed on the objects of the present invention.

Into the semiconductive polyvinylidene fluoride resin compositions according to the present invention, may be suitably incorporated general-purpose additives, for example, antioxidants, lubricants, plasticizers, organic pigments, inorganic pigments, ultraviolet absorbents, surfactants, inorganic acids, organic acids, pH adjusters, crosslinking agents, coupling agents, etc. so far as no detrimental influence is thereby imposed on the effects of the present invention.

Preparation process, molding or forming process and application fields of the resin composition:

No particular limitation is imposed on the preparation process of the semiconductive polyvinylidene fluoride resin compositions according to the present invention. However, as examples of preferable processes, may be mentioned the following processes:

(1) a process in which powder or pellets of the polyvinylidene fluoride resin (A), the quaternary ammonium salt (B) and the conductive carbon black (C) are mixed in a mixing machine such as a mixer;

(2) a process in which the respective components are mixed in a mixing machine, and the mixture is then pelletized by a melt extrusion process;

(3) a process in which the respective components are dissolved or dispersed in water or a mixed solvent of water and a water-soluble solvent, the resultant solution or dispersion is mixed in a mixing machine such as a mixer and then dried, and the resultant dry product is melt-extruded into pellets; and (4) a process in which pellets obtained by mixing the polyvinylidene fluoride resin (A) with the quaternary ammonium salt (B) and pelletize the mixture are mixed with pellets obtained by mixing the polyvinylidene fluoride resin (A) with the conductive carbon black (C) and pelletize the mixture in a mixing machine such as a mixer.

The semiconductive polyvinylidene fluoride resin compositions according to the present invention can be formed into various formed or molded products (including coated products) in accordance with various forming or molding processes such as press molding, melt extrusion, injection molding, solution casting and coating processes. It is also permissible to prepare a master batch in advance by incorporating the quaternary ammonium salt (B) and the conductive carbon black (C) at high concentrations into the polyvinylidene fluoride resin (A), dilute the master batch with the resin to concentrations of the respective components required upon forming or molding, and then conduct the forming or molding and processing.

When the semiconductive polyvinylidene fluoride resin composition according to the present invention is extruded into a seamless belt, a continuous melt extrusion process is preferably used. As a preferable continuous melt extrusion process of the seamless belt, may be mentioned a process in which a single-screw extruder and a spiral ring die are used to extrude the resin composition directly under the die from a die lip, and the extrudate is taken up while controlling the inner diameter of the extrudate by an internal cooling mandrel system.

As a process for producing a sheet using the semiconductive polyvinylidene fluoride resin composition according to the present invention, may be mentioned a continuous extrusion process in which a single-screw or twin-screw extruder and a T-die are used to extrude the resin composition in the molten state directly under the die from a die lip, and the extrudate is cooled and solidified while bringing it into close contact with a cooling drum by an air knife or the like. In order to solidify the semiconductive polyvinylidene fluoride resin composition according to the present invention in a molten state, it is preferred to control a cooling temperature within a range of generally from −30 to 150° C., preferably from 0 to 100° C. From the viewpoint of physical properties, a cooling temperature of 0 to 30° C. is particularly preferred.

The semiconductive polyvinylidene fluoride resin compositions according to the present invention can be formed into a roll by extrusion or injection molding. A tube or sheet formed of the semiconductive polyvinylidene fluoride resin compositions according to the present invention may be coated on a core bar, thereby obtaining a coated roll. A coating layer composed of the resin composition may be formed on a core bar by a solution casting process or coating process. Such a coating layer may be directly provided on the core bar, but may be provided through another resin layer and/or rubber layer as needed.

The semiconductive polyvinylidene fluoride resin compositions according to the present invention are suitably used as static charge controlling members such as charging rolls, developing rolls, transfer rolls, conveyer rolls, charging belts, developing belts, transfer belts, conveyer belts and static charge eliminating belts in image forming apparatus of the electrophotographic system.

The semiconductive polyvinylidene fluoride resin compositions according to the present invention are suitably used for antistatic films and antistatic containers for packaging electronic parts, anti-dust-collecting members used in various OA apparatus, static charge eliminating members, conductive members, etc.

No particular limitation is imposed on the forming or molding process of the semiconductive polyvinylidene fluoride resin compositions according to the present invention. They may be formed and processed into, for example, sheets and fibers by the publicly known processes such as injection molding and melt extrusion. After the processing, the sheets and fibers may be further stretched and heat set.

The semiconductive polyvinylidene fluoride resin compositions according to the present invention may be used either singly or in the form of laminate sheets or laminate belts, composite filaments, or the like in combination with other resin layers or the like as needed.

EXAMPLES

The present invention will hereinafter be described more specifically by the following Examples and Comparative Examples. Incidentally, physical properties in the examples were measured in accordance with the following respective methods:

(1) Thickness measurement:

The thickness of each molding sample was measured by a dial gauge thickness meter (DG-911, trade name, manufactured by Ono Sokki K.K.).

(2) Volume resistivity:

In the present invention, with respect to a sample having a volume resistivity of at least $10^{10}$ Ωcm, the sample was held in a resistivity cell (HP16008B, trade name, manufactured by Hewlett Packard Co.) having ring electrodes (diameter of an inner electrode: 26.0 mm; inner diameter of an outer electrode: 38.0 mm; outer diameter of the outer electrode: 40.0 mm) under a load of 7 kg, and a volume resistivity $\rho_v$ of the sample when applying voltage of 500 V for 1 minute between the inner electrode and a counter electrode in a thickness-wise direction of the sample was measured by a resistance meter (Hiresistance Meter HP4339A, trade name, manufactured by Hewlett Packard Co.). The details of the volume resistivity measuring method by such a ring electrode method may be referred to JIS K 6911.

In the present invention, with respect to a sample having a volume resistivity not lower than $10^6$ Ωcm, but lower than $10^{10}$ Ωcm, the sample was held between a ring probe (HRS Probe, trade name, manufactured by Mitsubishi Kagaku Co., Ltd.; diameter of an inner electrode: 5.9 mm; inner diameter of an outer electrode: 11.0 mm; outer diameter of the outer electrode: 17.8 mm) and a measuring stage (Resitable FL, trade name, manufactured by Mitsubishi Kagaku Co., Ltd.) to press the sample under a pressure of about 3 kg, and voltage of 100 V was applied between the inner electrode of the probe and the measuring stage to measure a volume resistivity $\rho_v$ of the sample by a volume resistivity meter (Hirestor IP, trade name, manufactured by Mitsubishi Kagaku Co., Ltd.). The details of the volume resistivity measuring method by such a ring electrode method may be referred to JIS K 6911.

In the present invention, with respect to a sample having a volume resistivity lower than $10^6$ Ωcm, the volume resistivity $\rho_v$ thereof was measured by means of a four prove (PSP Probe, trade name, manufactured by Mitsubishi Kagaku Co., Ltd.; pin interval: 1.5 mm) and a volume resistivity meter (Lorestor HP, trade name, manufactured by Mitsubishi Kagaku Co., Ltd.). The details of the volume resistivity measuring method by such a four probe method may be referred to JIS K 7194.

(3) Calculation of average value:

In the above-described measurements of the thickness and volume resistivity, the measurements were conducted at optionally selected 20 measuring points per $m^2$ of the surface area of a sample to be measured to find the maximum values, minimum values and average values (arithmetic mean) thereof.

(4) Dependency of volume resistivity on humidity:

In the present invention, a sample was held in a resistivity cell (HP16008B, trade name, manufactured by Hewlett Packard Co.) having ring electrodes (diameter of an inner electrode: 26.0 mm; inner diameter of an outer electrode: 38.0 mm; outer diameter of the outer electrode: 40.0 mm) under a load of 7 kg, and left to stand for 24 hours in a thermo-hygrostatic chamber (LH30-13M, trade name, manufactured by Nagano Kagaku Kikai Seisakusho K.K.) controlled at predetermined temperature and humidity, and a volume resistivity $\rho_v$ of the sample when applying voltage of 100 V for 1 minute between the inner electrode and a counter electrode in a thickness-wise direction of the sample was then determined by a resistance meter (Hirestor IP, trade name, manufactured by Mitsubishi Kagaku Co., Ltd.).

The details of the volume resistivity measuring method by such a ring electrode method may be referred to JIS K 6911. The volume resistivity was respectively measured in environments of 30%, 50%, 70% and 90% relative humidity (RH) after controlling the humidity for 24 hours in that order.

(5) Dependency of surface resistivity on humidity:

In the present invention, a sample was held in a resistivity cell (HP16008B, trade name, manufactured by Hewlett Packard Co.) having ring electrodes (diameter of an inner electrode: 26.0 mm; inner diameter of an outer electrode: 38.0 mm; outer diameter of the outer electrode: 40.0 mm) under a load of 7 kg, and left to stand for 24 hours in a thermo-hygrostatic chamber (LH30-13M, trade name, manufactured by Nagano Kagaku Kikai Seisakusho K.K.) controlled at a predetermined temperature and humidity, and a surface resistivity $\rho_s$ of the sample when applying voltage of 10 V for 1 minute between the inner electrode and the outer electrode in a direction of the surface of the sample was then measured by a resistance meter (Hirestor IP, trade name, manufactured by Mitsubishi Kagaku Co., Ltd.).

The details of the surface resistivity measuring method by such a ring electrode method may be referred to JIS K 6911. The surface resistivity was respectively measured in environments of 30%, 50%, 70% and 90% relative humidity (RH) after controlling the humidity for 24 hours in that order.

[Examples 1 to 10 and Comparative Examples 1 to 5]

Resin powders and additives were respectively charged into a mixing machine (Super Mixer, trade name, manufactured by Kawada Seisakusho K.K.) in accordance with their corresponding formulations shown in Table 1 to thoroughly stir and mix them for 5 minutes at 1,000 rpm. Each of the resultant mixtures was then formed into pellets having a diameter of about 5 mm by means of a single-screw extruder (manufactured by Pla Giken K.K.) at a die temperature of 240° C. The raw material thus pelletized was fed to a T-die (die temperature: 240° C.) having a lip clearance of 0.7 mm using a single-screw extruder (manufactured by Pla Giken K.K.), and a molten resin extruded from the die was cooled on a cooling roll controlled at 90° C. to form a sheet having a thickness of 100 μm. The measurement results of physical properties are shown in Table 1.

TABLE 1

| | | Composition (part by weight) | | | Volume resistivity (Ω cm) | | |
| --- | --- | --- | --- | --- | --- | --- | --- |
| | | Resin | Electrolyte | Carbon black | Average | Maximum | Minimum |
| Example | 1 | PVDF(100) | TBAHS (2) | AB (3.1) | $7.5 \times 10^9$ | $9.1 \times 10^9$ | $6.1 \times 10^9$ |
| | 2 | PVDF(100) | TBAHS (2) | AB (6.4 | $4.6 \times 10^9$ | $5.1 \times 10^9$ | $2.8 \times 10^9$ |
| | 3 | PVDF(100) | TBAHS (2) | AB (7.2) | $2.9 \times 10^9$ | $3.8 \times 10^9$ | $1.7 \times 10^9$ |

TABLE 1-continued

| | | Composition (part by weight) | | Carbon | Volume resistivity (Ω cm) | | |
|---|---|---|---|---|---|---|---|
| | | Resin | Electrolyte | black | Average | Maximum | Minimum |
| | 4 | PVDF(100) | TBAHS (2) | AB (8.1) | $8.5 \times 10^8$ | $1.2 \times 10^9$ | $6.1 \times 10^8$ |
| | 5 | PVDF(100) | TBAHS (2) | AB (9.0) | $1.1 \times 10^8$ | $1.3 \times 10^8$ | $7.5 \times 10^7$ |
| | 6 | VDFP(100) | TBAHS (2) | AB (3.1) | $2.6 \times 10^9$ | $3.0 \times 10^9$ | $2.2 \times 10^9$ |
| | 7 | VDFP(100) | TBAHS (2) | AB (6.4) | $6.2 \times 10^8$ | $8.5 \times 10^8$ | $5.2 \times 10^8$ |
| | 8 | VDFP(100) | TBAHS (2) | AB (7.2) | $3.8 \times 10^8$ | $4.7 \times 10^8$ | $2.8 \times 10^8$ |
| | 9 | VDFP(100) | TBAHS (2) | AB (8.1) | $1.7 \times 10^8$ | $2.1 \times 10^8$ | $1.2 \times 10^8$ |
| | 10 | VDFP(100) | TBAHS (2) | AB (9.0) | $1.8 \times 10^7$ | $4.1 \times 10^7$ | $8.9 \times 10^6$ |
| Comparative | 1 | PVDF(100) | KCl (2) | AB (3.1) | $7.3 \times 10^{13}$ | $8.1 \times 10^{14}$ | $5.4 \times 10^{13}$ |
| Example | 2 | PVDF(100) | KCl (2) | AB (6.4) | $7.5 \times 10^{13}$ | $8.8 \times 10^{13}$ | $5.1 \times 10^{13}$ |
| | 3 | PVDF(100) | KCl (2) | AB (7.2) | $6.8 \times 10^{13}$ | $8.1 \times 10^{13}$ | $4.4 \times 10^{12}$ |
| | 4 | PVDF(100) | KCl (2) | AB (8.1) | $3.2 \times 10^9$ | $2.6 \times 10^{11}$ | $1.5 \times 10^7$ |
| | 5 | PVDF(100) | KCl (2) | AB (9.0) | $8.1 \times 10^3$ | $2.0 \times 10^4$ | $14.3 \times 10^3$ |

Note:
(1) PVDF: polyvinylidene fluoride (KF#1000, trade name, product of Kureha Kagaku Kogyo K.K.)
(2) VDFP: vinylidene fluoride-propylene hexafluoride copolymer (KF#2300, trade name, product of Kureha Kagaku Kogyo K.K.)
(3) TBAHS: $(C_4H_9)_4N(HSO_4)$ (product of Koei Chemical Industry Co., Ltd.)
(4) KCl: potassium chloride (product of Wako Pure Chemical Industries, Ltd.)
(5) AB: acetylene black (Denka Black, trade name; product of Denki Kagaku Kogyo Kabushiki Kaisha; DBP oil absorption: 190 ml/100 g, average particle diameter ($d_{50}$): 42 nm, ash content: 0.06%).

As apparent from the results shown in Table 1, the semiconductive polyvinylidene fluoride resin compositions (Examples 1 to 10) according to the present invention are moderately low in volume resistivity, narrow in scatter of volume resistivity with location. Further, in Examples 1 to 10, neither aggregate and fish eye nor bleed-out of additives were observed in all the samples.

On the other hand, in the cases where potassium chloride was used as an ionic electrolyte (Comparative Examples 1 to 5), those difficult to fully lower the volume resistivity (Comparative Examples 1 to 3) and those extremely uneven in volume resistivity distribution and wide in a scatter thereof (Comparative Examples 3 to 5) were only provided even when it is used in combination with the conductive carbon black, and no resin composition having satisfactory physical properties was able to be provided. In addition, an undissolved ionic electrolyte was observed as fish eye in the samples of Comparative Examples 1 to 5.

[Dependency of volume resistivity on humidity]

Figure 1:
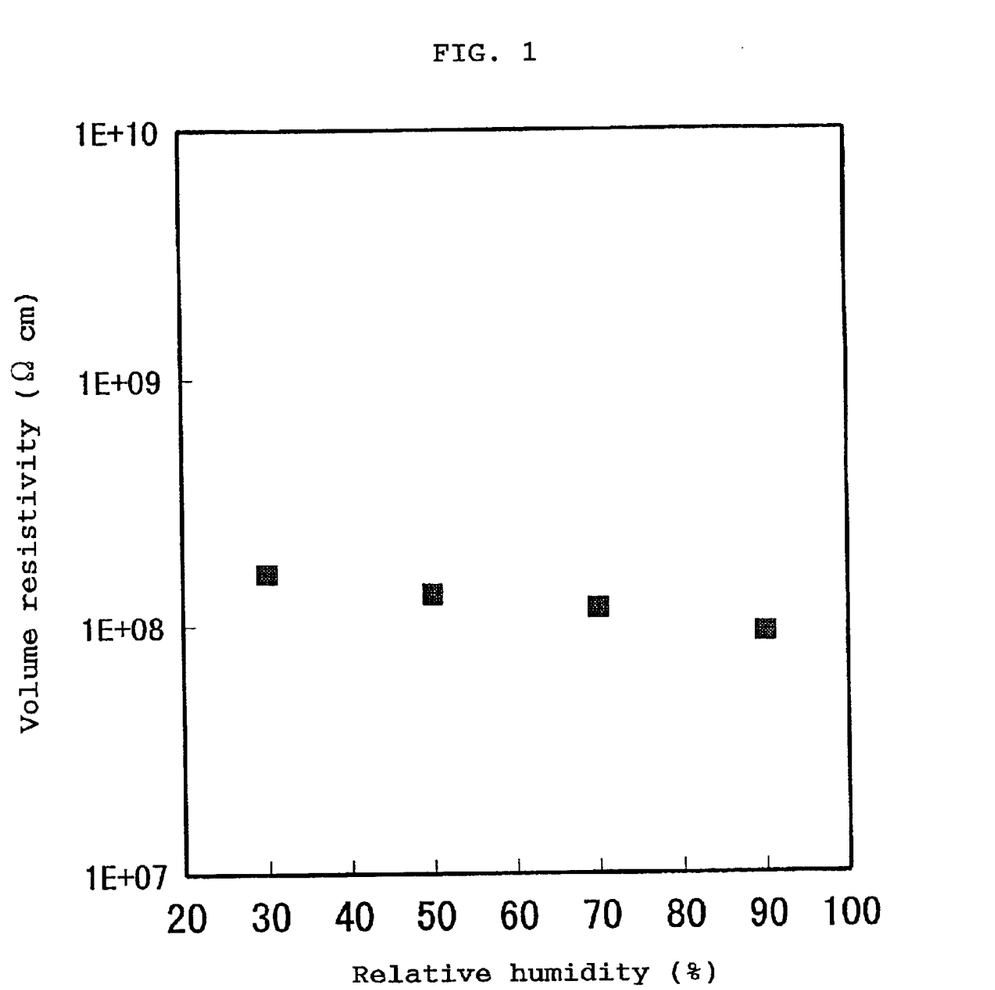
FIG. 1 diagrammatically illustrates the relationship between the volume resistivity of a sample prepared in Example 9 and relative humidity.

The sample prepared in Example 9 was used to determine the dependency of its volume resistivity on humidity. The result is illustrated in FIG. 1. As apparent from FIG. 1, the sheet sample obtained from the polyvinylidene fluoride resin composition according to the present invention is extremely low in the dependency of its volume resistivity on humidity.

[Dependency of surface resistivity on humidity]

Figure 2:
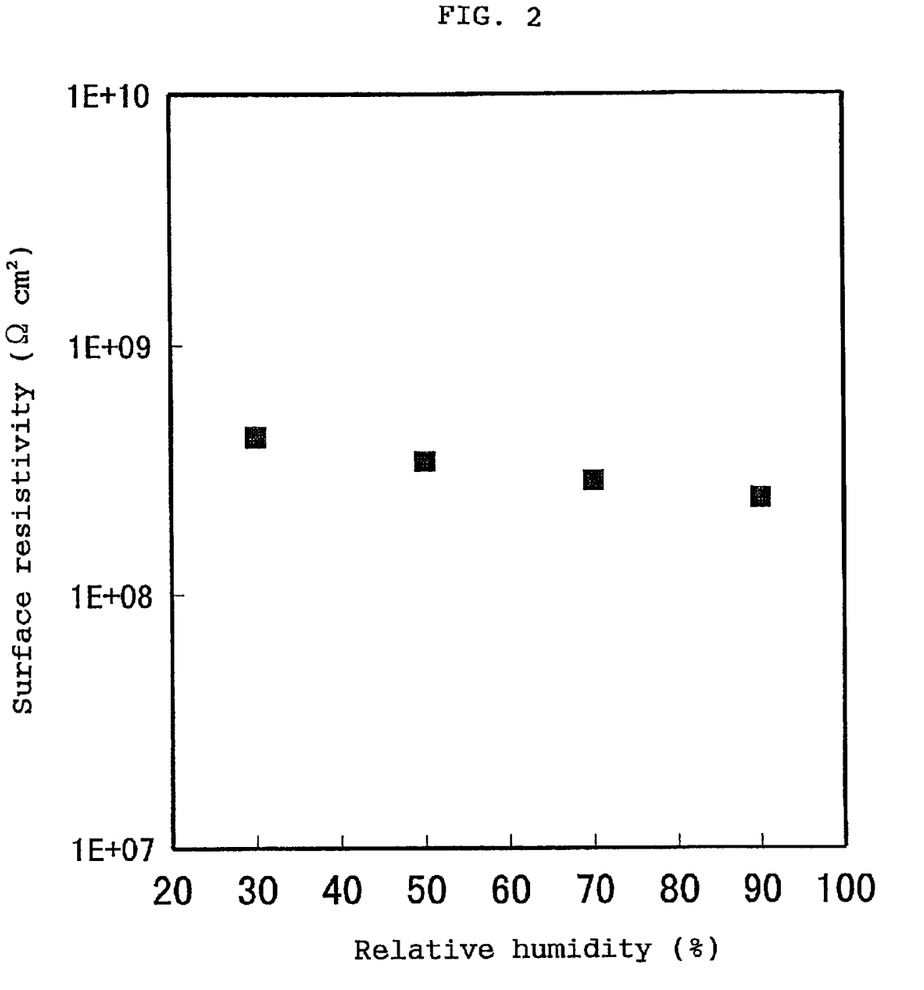
FIG. 2 diagrammatically illustrates the relationship between the surface resistivity of the sample prepared in Example 9 and relative humidity.

The sample prepared in Example 9 was used to determine the dependency of its surface resistivity on humidity. The result is illustrated in FIG. 2. As apparent from FIG. 2, the sheet sample obtained from the polyvinylidene fluoride resin composition according to the present invention is extremely low in the dependency of its surface resistivity on humidity.

INDUSTRIAL APPLICABILITY

According to the present invention, there are provided semiconductive polyvinylidene fluoride resin compositions which can stably and uniformly exhibit a fixed volume resistivity within a range of generally $10^4$–$10^{12}$ Ωcm, preferably $10^5$–$10^{10}$ Ωcm with good precision, and undergo extremely little changes in volume resistivity and surface resistivity by the change of environmental moisture.

The semiconductive polyvinylidene fluoride resin compositions can be used to obtain semiconductive formed or molded products, for example, tubes, sheets, fibers, containers, rolls, various kinds of injection-molded products, etc.

The semiconductive polyvinylidene fluoride resin compositions according to the present are suitable for use as, for example, materials for forming at least surface layers of static charge controlling members such as charging rolls, transfer rolls, developing rolls, charging belts, transfer belts and static charge eliminating belts installed in image forming apparatus of the electrophotographic system. Roll-like members include those as the outermost layer of which a layer of the semiconductive polyvinylidene fluoride resin composition is formed directly or through another resin layer and/or rubber layer on a core bar.

The semiconductive polyvinylidene fluoride resin compositions according to the present invention are also suitable for use as various kinds of static charge controlling members such as packaging materials (for example, films, bags and containers used for storage and conveyance) for electronic parts, wall paper, sheathing materials for OA apparatus, anti-static partitions, conveyor tubes for powder coatings, and the like.

What is claimed is:

1. A semiconductive polyvinylidene fluoride resin composition comprising 100 parts by weight of a polyvinylidene fluoride resin (A), 0.03 to 10 parts by weight of at least one quaternary ammonium salt (B) selected from the group consisting of tetraalkylammonium sulfates (B1) represented by the formula (1):

wherein $R^1$ to $R^4$ are alkyl groups which are the same or different from one another, and $R^5$ is an alkyl or fluoroalkyl group or a hydrogen atom, and tetraalkylammonium sulfites (B2) represented by the formula (2):

(2)

wherein $R^6$ to $R^9$ are alkyl groups which are the same or different from one another, and $R^{10}$ is an alkyl or fluoroalkyl group or a hydrogen atom, and 2 to 15 parts by weight of at least one conductive carbon black (C) selected from the group consisting of acetylene black and conductive oil furnace black and having a DBP oil absorption of at least 100 ml/100 g, and wherein the semiconductive polyvinylidene fluoride resin composition has a volume resistivity within a range of $10^4$ to $10^{12}$ Ωcm.

2. The semiconductive polyvinylidene fluoride resin composition according to claim 1, wherein the polyvinylidene fluoride resin (A) is at least one polyvinylidene fluoride resin selected from the group consisting of a homopolymer of vinylidene fluoride, vinylidene fluoride-hexafluoropropylene copolymers, vinylidene fluoride-tetrafluoroethylene copolymers and vinylidene fluoride-tetrafluoroethylene-hexafluoropropylene terpolymers.

3. The semiconductive polyvinylidene fluoride resin composition according to claim 1, wherein the quaternary ammonium salt (B) is a tetraalkylammonium hydrogensulfate in which $R^5$ in the formula (1) is a hydrogen atom.

4. The semiconductive polyvinylidene fluoride resin composition according to claim 3, wherein the tetraalkylammonium hydrogensulfate is tetrabutylammonium hydrogensulfate $[(C_4H_9)_4N(HSO_4)]$.

5. A formed or molded product composed of a semiconductive polyvinylidene fluoride resin composition comprising 100 parts by weight of a polyvinylidene fluoride resin (A), 0.03 to 10 parts by weight of at least one quaternary ammonium salt (B) selected from the group consisting of tetraalkylammonium sulfates (B1) represented by the formula (1):

(1)

wherein $R^1$ to $R^4$ are alkyl groups which are the same or different from one another, and $R^5$ is an alkyl or fluoroalkyl group or a hydrogen atom, and tetraalkylammonium sulfites (B2) represented by the formula (2):

(2)

wherein $R^6$ to $R^9$ are alkyl groups which are the same or different from one another, and $R^{10}$ is an alkyl or fluoroalkyl group or a hydrogen atom, and 2 to 15 parts by weight of at least one conductive carbon black (C) selected from the group consisting of acetylene black and conductive oil furnace black and having a DBP oil absorption of at least 100 ml/100 g, and wherein the semiconductive polyvinylidene fluoride resin composition has a volume resistivity within a range of $10^4$ to $10^{12}$ Ωcm.

6. The formed or molded product according to claim 5, wherein the polyvinylidene fluoride resin (A) is at least one polyvinylidene fluoride resin selected from the group consisting of a homopolymer of vinylidene fluoride, vinylidene fluoride-hexafluoropropylene copolymers, vinylidene fluoride-tetrafluoroethylene copolymers and vinylidene fluoride-tetrafluoroethylene-hexafluoropropylene terpolymers.

7. The formed or molded product according to claim 5, wherein the quaternary ammonium salt (B) is a tetraalkylammonium hydrogensulfate in which $R^5$ in the formula (1) is a hydrogen atom.

8. The formed or molded product according to claim 7, wherein the tetraalkylammonium hydrogensulfate is tetrabutylammonium hydrogensulfate $[(C_4H_9)_4N(HSO_4)]$.

9. The formed or molded product according to claim 5, which is a sheet, tube, seamless belt, fiber, container, roll or injection-molded product.

10. The formed or molded product according to claim 5, which is a static charge controlling member at least the surface layer of which has been formed from the semiconductive polyvinylidene fluoride resin composition.

11. The formed or molded product according to claim 10, wherein the static charge controlling member is a charging member or static charge eliminating member used in an image forming apparatus of an electrophotographic system.

12. The formed or molded product according to claim 10, wherein the static charge controlling member is a packaging material for electronic parts, wall paper, sheathing material for OA apparatus, anti-static partition, conveyor tube for fuels or conveyor tube for powder coatings.

* * * * *